(12) United States Patent
Meller

(10) Patent No.: US 7,830,033 B2
(45) Date of Patent: Nov. 9, 2010

(54) WIND TURBINE ELECTRICITY GENERATING SYSTEM

(76) Inventor: Moshe Meller, 8 Balfur St., Tel Aviv (IL) 65213

( * ) Notice: Subject to any disclaimer, the term of this patent is extended or adjusted under 35 U.S.C. 154(b) by 0 days.

(21) Appl. No.: 12/772,736

(22) Filed: May 3, 2010

(65) Prior Publication Data

US 2010/0259050 A1 Oct. 14, 2010

Related U.S. Application Data

(63) Continuation-in-part of application No. PCT/US2009/043807, filed on May 13, 2009, and a continuation-in-part of application No. 12/144,222, filed on Jun. 23, 2008, now Pat. No. 7,582,981.

(60) Provisional application No. 61/054,397, filed on May 19, 2008.

(51) Int. Cl.
*F03D 9/00* (2006.01)
*H02P 9/04* (2006.01)
*F03B 13/10* (2006.01)
*F03B 13/12* (2006.01)

(52) U.S. Cl. .............................. 290/55; 290/44; 290/53

(58) Field of Classification Search ................... 290/53, 290/55, 44
See application file for complete search history.

(56) References Cited

U.S. PATENT DOCUMENTS

| 1,963,912 | A | * | 6/1934 | Honnef | 416/121 |
| 2,153,523 | A | * | 4/1939 | Edmonds et al. | 290/55 |
| 2,388,377 | A | * | 11/1945 | Albers | 290/55 |

(Continued)

FOREIGN PATENT DOCUMENTS

JP 57-070964 A 5/1982

(Continued)

OTHER PUBLICATIONS

Notification of Transmittal of the International Search Report and the Written Opinion of the International Searching Authority, or the Declaration issued in PCT/US/2009/043807, mailed Jan. 14, 2010.

(Continued)

*Primary Examiner*—T C Patel
*Assistant Examiner*—Pedro J Cuevas
(74) *Attorney, Agent, or Firm*—Holtz, Holtz, Goodman & Chick, PC

(57) ABSTRACT

System for producing electricity from wind energy includes a shaft, at least two turbines rotatably mounted to the shaft and arranged to rotate independent of one another and in opposite directions when subjected to the same wind, and one or more generators that convert rotation of the turbines into electricity. The magnitude of electricity generation by the generator(s) is related to the magnitude of torque induced by the generator(s) on the shaft, and the electricity generation by the generator(s) may be controlled such that torques induced on the shaft by the generator(s) is controlled such that a sum of torques induced on the shaft is substantially zero. Generated electricity is conducted to users, to electricity storage, or to processing components. In an airborne embodiment, a lifting structure generates a lifting force to lift the turbines to a desired altitude, and an anchoring system anchors the turbines relative to the ground.

21 Claims, 9 Drawing Sheets

U.S. PATENT DOCUMENTS

| | | | | |
|---|---|---|---|---|
| 3,944,839 A * | 3/1976 | Carter | | 290/55 |
| 4,039,848 A * | 8/1977 | Winderl | | 290/55 |
| 4,068,132 A * | 1/1978 | Bardekoff | | 290/55 |
| 4,073,516 A | 2/1978 | Kling | | 290/55 |
| 4,084,102 A | 4/1978 | Fry et al. | | 290/55 |
| 4,165,468 A | 8/1979 | Fry et al. | | 290/55 |
| 4,166,569 A | 9/1979 | Begnaud et al. | | 229/122.33 |
| 4,166,596 A | 9/1979 | Mouton et al. | | 244/30 |
| 4,183,717 A * | 1/1980 | Yamada | | 416/121 |
| 4,213,057 A * | 7/1980 | Are | | 290/44 |
| 4,219,303 A | 8/1980 | Mouton, Jr. et al. | | 415/7 |
| 4,285,481 A | 8/1981 | Biscomb | | 244/33 |
| 4,309,006 A | 1/1982 | Biscomb | | 244/33 |
| 4,345,161 A * | 8/1982 | Crompton | | 290/55 |
| 4,350,896 A * | 9/1982 | Benoit | | 290/55 |
| 4,350,897 A * | 9/1982 | Benoit | | 290/55 |
| 4,350,898 A | 9/1982 | Benoit | | 290/55 |
| 4,350,899 A | 9/1982 | Benoit | | 290/55 |
| 4,358,243 A | 11/1982 | Heath | | 416/11 |
| 4,383,182 A | 5/1983 | Bowley | | 290/43 |
| 4,450,364 A | 5/1984 | Benoit | | 290/55 |
| 4,470,563 A | 9/1984 | Engelsman | | 244/33 |
| 4,491,739 A | 1/1985 | Watson | | 290/44 |
| 4,495,423 A | 1/1985 | Rogers | | 290/44 |
| 4,547,124 A | 10/1985 | Kliatzkin et al. | | 416/86 |
| 4,572,962 A | 2/1986 | Shepard | | 290/55 |
| 4,997,414 A * | 3/1991 | Camara et al. | | 475/330 |
| 5,040,948 A | 8/1991 | Harburg | | 416/85 |
| 5,062,765 A | 11/1991 | McConachy | | 415/4.3 |
| 5,506,453 A | 4/1996 | McCombs | | 290/44 |
| 5,798,632 A | 8/1998 | Muljadi | | 322/29 |
| 5,876,181 A * | 3/1999 | Shin | | 415/2.1 |
| 6,091,161 A | 7/2000 | Dehlsen et al. | | 290/43 |
| 6,097,104 A * | 8/2000 | Russell | | 290/54 |
| 6,127,739 A | 10/2000 | Appa | | 290/55 |
| 6,172,429 B1 * | 1/2001 | Russell | | 290/54 |
| 6,278,197 B1 | 8/2001 | Appa | | 290/55 |
| 6,476,513 B1 * | 11/2002 | Gueorguiev | | 290/55 |
| 6,492,743 B1 | 12/2002 | Appa | | 290/55 |
| 6,504,260 B1 * | 1/2003 | Debleser | | 290/44 |
| 6,692,230 B2 * | 2/2004 | Selsam | | 416/132 B |
| 6,781,254 B2 | 8/2004 | Roberts | | 290/55 |
| 6,945,747 B1 | 9/2005 | Miller | | 415/4.3 |
| 6,975,045 B2 * | 12/2005 | Kurachi et al. | | 290/44 |
| 7,109,598 B2 * | 9/2006 | Roberts et al. | | 290/44 |
| 7,129,596 B2 | 10/2006 | Macedo | | 290/55 |
| 7,183,663 B2 | 2/2007 | Roberts et al. | | 290/44 |
| 7,309,930 B2 | 12/2007 | Suryanarayanan et al. | | 290/55 |
| 7,317,261 B2 | 1/2008 | Rolt | | 290/55 |
| 7,335,000 B2 | 2/2008 | Ferguson | | 417/7 |
| 7,384,239 B2 | 6/2008 | Wacinski | | 416/128 |
| 7,489,046 B2 | 2/2009 | Costin | | 290/43 |
| 7,538,446 B2 * | 5/2009 | Bonnet | | 290/55 |
| 7,582,981 B1 | 9/2009 | Meller | | 290/44 |
| 7,602,077 B2 * | 10/2009 | Ferguson | | 290/55 |
| 7,679,209 B2 * | 3/2010 | Rashidi | | 290/55 |
| 7,679,249 B2 * | 3/2010 | Appa et al. | | 310/114 |
| 7,709,973 B2 * | 5/2010 | Meller | | 290/55 |
| 7,723,861 B2 * | 5/2010 | Meller | | 290/55 |
| 2002/0192070 A1 * | 12/2002 | Selsam | | 415/4.3 |
| 2004/0096327 A1 * | 5/2004 | Appa et al. | | 416/1 |
| 2006/0251505 A1 | 11/2006 | Ferguson | | 415/4.1 |
| 2007/0228738 A1 | 10/2007 | Wrage et al. | | 290/44 |
| 2008/0023964 A1 | 1/2008 | Sureshan | | 290/55 |
| 2008/0048453 A1 | 2/2008 | Amick | | 290/44 |
| 2008/0296905 A1 | 12/2008 | Ferguson | | 290/55 |
| 2008/0315697 A1 * | 12/2008 | Bonnet | | 310/83 |
| 2009/0152391 A1 | 6/2009 | McWhirk | | 244/30 |
| 2010/0032947 A1 | 2/2010 | Bevirt | | 290/44 |
| 2010/0032948 A1 | 2/2010 | Bevirt | | 290/44 |
| 2010/0032949 A1 | 2/2010 | Varrichio et al. | | 290/44 |
| 2010/0066093 A1 | 3/2010 | Meller | | 290/55 |
| 2010/0066095 A1 | 3/2010 | Meller | | 290/55 |
| 2010/0111697 A1 * | 5/2010 | Wood | | 416/128 |

FOREIGN PATENT DOCUMENTS

| | | |
|---|---|---|
| JP | 2-161173 A | 6/1990 |
| WO | WO 2007/051034 A2 | 5/2007 |

OTHER PUBLICATIONS

Related U.S. Appl. No. 12/634,499, filed Dec. 10, 2009; entitled: "Airborne Stabilized Wind Turbines Systems" Inventor: Moshe Meller.

International Search Report dated May 27, 2010 (3 pages), issued in counterpart International Application No. PCT/US2009/056227 of related U.S. Appl. No. 12/284,246.

* cited by examiner

WIND TURBINE ELECTRICITY GENERATING SYSTEM

CROSS REFERENCE TO RELATED APPLICATIONS

This application is a continuation-in-part of International Application PCT/US2009/043807, with an international filing date of May 13, 2009, that claims priority of U.S. provisional patent application Ser. No. 61/054,397 filed May 19, 2008, now expired, and U.S. patent application Ser. No. 12/144,222 filed Jun. 23, 2008, now U.S. Pat. No. 7,582,981, all of which are incorporated by reference herein.

FIELD OF THE INVENTION

The present invention relates generally to a wind turbine system for generating electricity and more specifically to a wind turbine system for generating electricity that includes both turbines and generators on a common structure.

BACKGROUND OF THE INVENTION

Wind energy is one of the most readily available forms of natural energy, which include solar, hydro, geothermal energy, and is therefore often used to generate electricity. The density of wind energy, in terms of watts per square meter, is one of the highest among other forms of natural energy.

Existing systems for utilizing wind energy to generate electricity have certain disadvantages. For example, since wind velocity generally increases with altitude and a large wind velocity is critical to optimize wind-based electricity generation, tall towers must be constructed to elevate a wind turbine to a high operational altitude in order to maximize the potential to generate electricity from the wind. However, tall towers are expensive to build and once built, are subject to intense vibrations during operation. Furthermore, land for building the towers to support such wind turbines is limited in view of numerous, known factors, including acquisition costs, environmental impact, zoning issues.

Although offshore winds, i.e., winds over bodies of water, are stronger than winds over land, the construction of support structures for wind turbines over a body of water is expensive, although there are significantly fewer limitations on the space for building support structures over such bodies of water. The most notable limitation is that the construction of support structures for wind turbines is limited to certain depths of the bodies of water.

In view of the problems with installing wind-based electricity generating systems over land or bodies of water, flying windmills have been developed. Generally, such flying windmills do not require an extensive support structure connected to land or otherwise anchored over a body of water. One such flying windmill is the well-known Magenn system, which is lighter than air, and utilizes the Magnus effect. A drawback of this prior art system is that its power generation is very limited and it is not very efficient.

Another flying windmill currently under development is a flying electric generator, by Sky Wind Power Company. This system is heavier than the air and attempts to utilize the wind in the upper level of the atmosphere. Among its drawbacks are that it is expensive to construct, includes complex mechanical parts and is not very practical.

It would therefore be desirable to provide a wind-based, electricity-generating system which overcomes the drawbacks of the systems mentioned above.

OBJECTS AND SUMMARY OF THE INVENTION

It is an object of the present invention to provide a new and improved system and method for generating electricity from wind.

It is another object of some embodiments of the invention to provide a new and improved system and method for generating electricity from wind using a lighter-than-air structure which is capable of varying its operational altitude and/or adapting to different wind velocities to thereby achieve a relatively high operational efficiency and provide a relatively high electricity-generating capacity while also having low construction and maintenance costs.

In order to achieve these objects and possibly others, a system for producing electricity from atmospheric wind energy in accordance with the invention includes a shaft, a turbine section including at least two turbines rotatably mounted to the shaft and arranged to rotate independent of one another and in opposite directions when subjected to the same wind, and at least one generator arranged to convert rotation of the turbines into electricity. The magnitude of electricity generated by the generator(s) is related to rotation of the turbines so that when electricity generation by the generator(s) is controlled, rotation of the turbines is controlled and torque induced on the shaft by the generator(s) through the rotation of the turbines can be controlled. The electricity generated by the generator(s) is conducted to an electricity storage, usage or processing component.

To enable the turbines to rotate in opposite directions, each is mounted to the shaft by a respective bearing assembly and provided with at least one blade. The blades on the turbines have opposite angles of attack and thereby rotate in opposite directions when subjected to the same wind impacting the blades.

To enable control of rotation of the turbines upon control of the generator(s), each generator includes a rotatable shaft whose rotation causes generation of electricity and a transmission structure is interposed between the turbines and the generator(s) for transmitting rotation of the turbines into rotation of the shaft(s) of the generator(s) and thus generation of electricity by the generator(s). In one embodiment, the transmission structure includes a turbine gear fixed to each turbine and a generator gear fixed to or part of the shaft of each generator and which is intermeshed with one of the turbine gears.

When this system is optionally implemented as an airborne system, the system also includes lifting structure coupled to the turbine section for generating a lifting force to enable the turbine section to be airborne at desired altitude, and an anchoring system for anchoring the turbine section relative to the ground. Electricity generation by the generator(s) is controlled by an angular stability control unit so that rotation of the turbines is controlled and torque induced on the shaft by the generator(s) through the rotation of the turbines is controlled. The angular stability control unit preferably controls the generator(s) in order to provide substantially zero resultant torque induced on the shaft by the operation of the generator(s) and thereby enables angular stability of the system, which can thus be continuous during operation of the system. The angular stability control unit may also control the angular position of flaps relative to fins which are fixed relative the central shaft to aid in maintaining angular stability of the system. The angular stability control unit may also control the angle of attack of the turbines blades, if variable. The angular stability control unit can utilize an electronic artificial horizon as a reference in order to achieve angular stability of the system relative to the horizon. Moreover, in view of its connection to the generator(s), the angular stability control unit can integrate electricity input from the generator(s) to a common electricity output conduit.

Various forms of the lifting structure are envisioned. In one form, the lifting structure includes a first inflatable body arranged on one side of the turbine section and a second inflatable body arranged on an opposite side of turbine section. The inflatable bodies include one or more cavities or compartments receivable of a lighter-than-air gas. In another form, the lifting structure consists of a single inflatable body arranged on one side of the turbine section and including one or more cavities or compartments receivable of a lighter-than-air gas. In this embodiment, the anchoring system includes a tether connected to the shaft on an opposite side of the turbine section.

In yet another form, the lifting structure includes one or more independent lift-generating bodies spaced apart from an assembly of the shaft, the turbine section and the generator(s), yet connected thereto, e.g., by a connecting structure of one or more tethers, to transfer a lifting force generated by each lift-generating body to the assembly. Each lift-generating body may be inflatable and therefore include one or more cavities or compartments receivable of a lighter-than-air gas, or non-inflatable in which case, it is provided with aerodynamic characteristics which enable it to assume a position in which it generates and transfers a large lifting force to the assembly when exposed to wind, or electricity driven unmanned helicopter which draw electricity from source on the ground level during takeoff and landing phases and draw electricity from the system during operation.

Other and further objects, advantages and features of the present invention will be understood by reference to the following specification in conjunction with the annexed drawings, wherein like parts have been given like numbers.

BRIEF DESCRIPTION OF DRAWINGS

The invention, together with further objects and advantages thereof, may best be understood by reference to the following description taken in conjunction with the accompanying drawings, wherein like reference numerals identify like elements, and wherein.

DETAILED DESCRIPTION OF THE INVENTION

Figure 1:
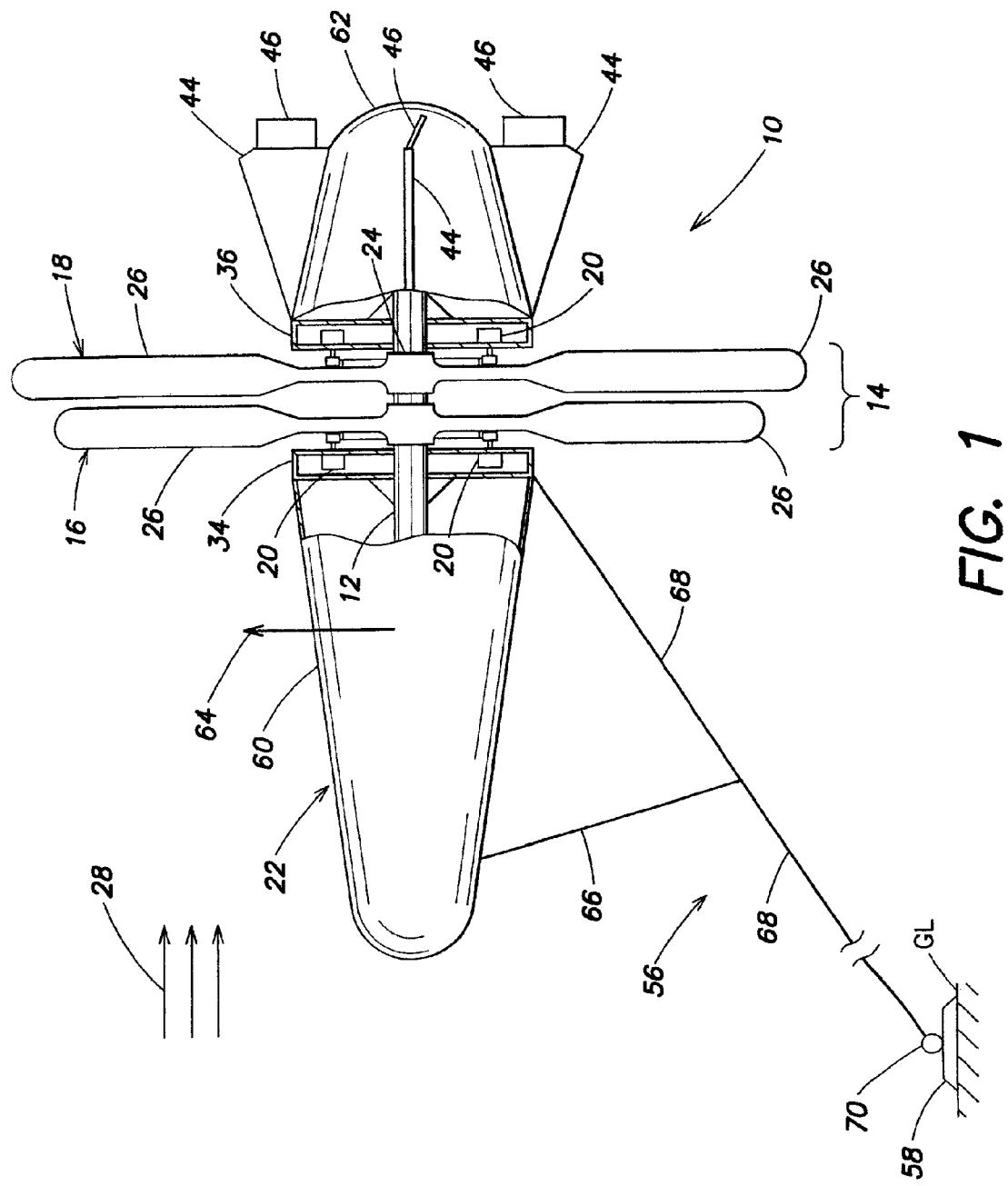
FIG. 1 is a side view, partly in cross-section, of a first embodiment of a wind turbine system in accordance with the present invention.

Referring to the accompanying drawings wherein the same reference numerals refer to the same or similar elements, a wind turbine system in accordance with the invention generally comprises a shaft, a turbine section including at least two turbines rotatably mounted to the shaft and one or more generators that convert the rotation of the turbines into electricity. The wind turbine system may be an airborne system that is movable in the atmosphere, although attached to the ground or a fixed structure by cables, tethers and the like, or alternatively, a stationary system that is fixedly attached to the ground. Both examples of airborne wind turbine systems and examples of a stationary system are disclosed herein.

With reference to FIGS. 1-6, an airborne wind turbine system in accordance with a first embodiment of the invention is designated generally as 10 and comprises a central shaft 12, a turbine section 14 including a front wind turbine 16 and a rear wind turbine 18 rotatably mounted to the shaft 12, generators 20 which convert rotation of the turbines 16, 18 into electricity, and a lifting structure 22 coupled to the turbine section 14 for generating a lifting force to enable the turbine section 14 to rise into the atmosphere. Although shaft 12 is referred to as a central shaft because it is preferably situated in the axial center of the system 12, it is conceivable that the shaft 12 may be positioned off-center, and thus the centrality of the shaft 12 should not be considered a limiting feature, but rather only a preferred feature.

Figure 2:
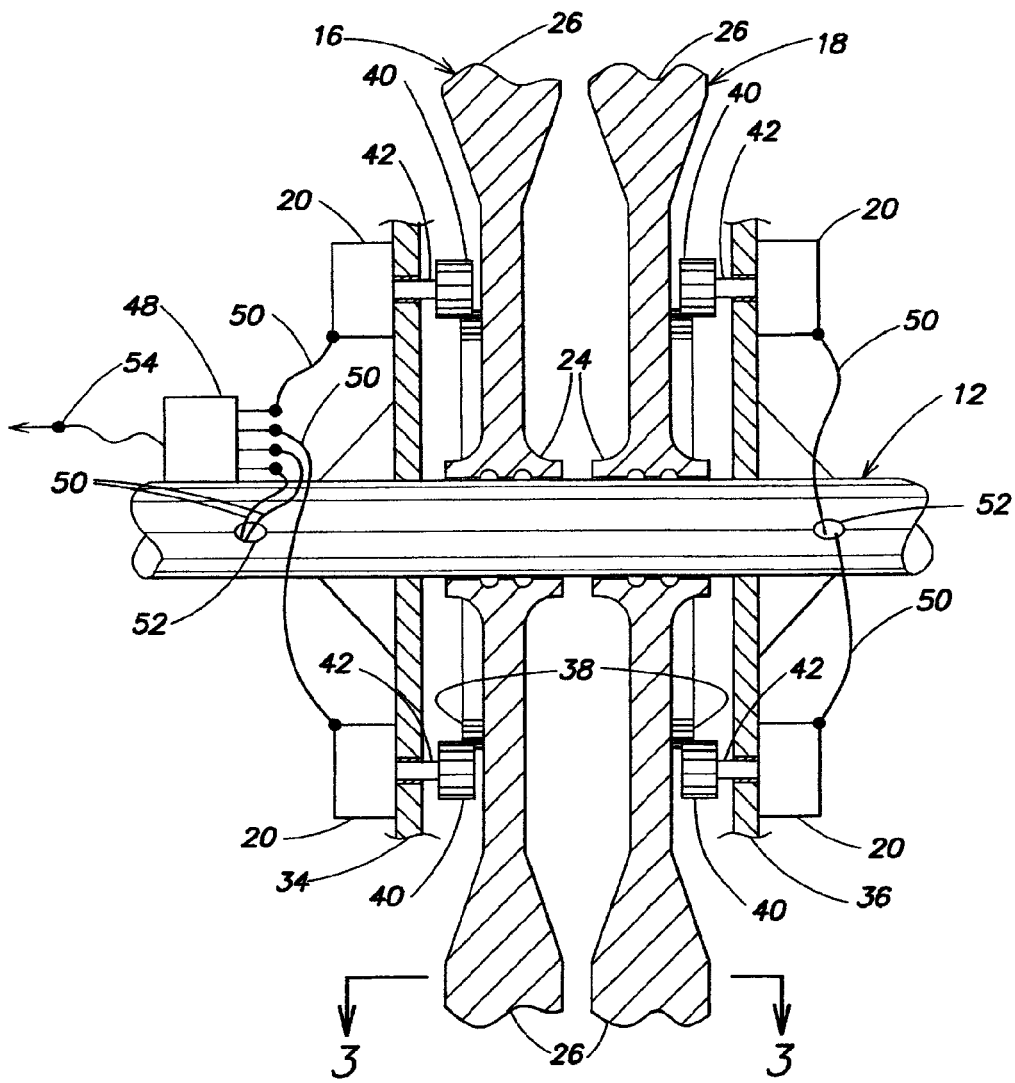
FIG. 2 is a detailed view of the turbine section of the wind turbine system shown in FIG. 1.

Each of the front and rear turbines 16, 18 includes a respective bearing assembly 24 which supports the turbine 16, 18 on the central shaft 12 and a plurality of blades or wings 26 extending radially outward from the bearing assembly 24 (see FIG. 2). The bearing assemblies 24 are constructed to enable the turbines 16, 18 to rotate freely relative to the shaft 12, although they still might induce a rotational or turning torque in the shaft 12, and independently relative to one another. This enables the turbines 16, 18 to rotate in opposite directions, the purpose of which is explained below.

As shown in FIG. 1, there are two blades 26 on each turbine 16, 18. However, the number of blades can vary and thus each turbine 16, 18 may include three, four or more blades. Moreover, the front turbine 16 and the rear turbines 18 may be provided with either the same or a different number of blades 26. Also, an embodiment is envisioned wherein there are more than two turbines, e.g., a plurality of pairs of turbines or possibly an odd number of turbines. Thus, both the number of turbines and the number of blades on each turbine is variable as desired.

The blades 26 are relatively long so that the turbines 16, 18 in their entirety are rather large. The size of the turbines 16, 18 and blades 26 may be limited by the lifting capability of the lifting structure 22 of the system 10, e.g., by the lifting capability of one or more gas-filled bodies as described below.

Figure 3:
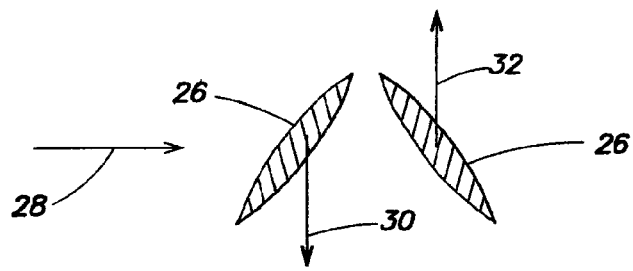
FIG. 3 is a cross-sectional view taken along the line 3-3 of FIG. 2.

FIG. 3 shows exemplary cross-sectional profiles of the blades 26 of the turbines 16, 18 which are provided to enable turbines 16, 18 to rotate in opposite directions. To this end, the angle of attack of the blades 26 of the front turbine 16 relative to the wind direction 28 is opposite the angle of attack of the blades 26 of the rear turbine 18. The forces 30, 32 therefore act on the turbines 16, 18 in opposite directions causing the turbines 16, 18 to rotate in opposite rotational directions, i.e., one clockwise and the other counterclockwise.

The span and other aerodynamic characteristics of the front and rear turbines 16, 18 and blades 26 thereof may be different in accordance with the requirement that each turbine 16, 18 produces almost the same amount of power (to enable zero torque on the shaft 12 to be present for the purpose described below). For example, as shown in FIG. 1, the span of the blades 26 of the rear turbine 18 is larger than the span of the blades 26 of the front turbine 16, and with other atmospheric conditions being equal, would receive more wind energy than the front turbine. However, since the wind affecting the rear turbine 18 has already been exposed to the effect of the front turbine 16, the larger span of the blades 26 of the rear turbine 18 is necessary to counter the effect of the front turbine 16 and enable the rear turbine 18 to have the same potential power output as the front turbine 16. Other aerodynamic characteristics such as wing profile can also varied between the blades 26 of the front and rear turbines 16, 18 to achieve the same result.

Several functions are served by the central shaft 12. In addition to supporting the turbines 16, 18 via their bearing assemblies 24, the central shaft 12 provides the entire system with constructional strength and axial or longitudinal rigidity. As such, the length of the central shaft 12 is preferably equal to the length of the system 10. Also, the central shaft 12 may have a relatively large diameter to provide it with sufficient strength to support the large turbines 16, 18.

The central shaft 12 and wind turbines 16, 18 are preferably made from composite materials, such as carbon fiber, in order to provide them with sufficient strength to withstand operational loads and yet have a weight to facilitate the ability of the system to remain airborne. Other materials can also be used for the central shaft 12 and wind turbines 16, 18.

One or more of the generators 20 is coupled to each wind turbine 16, 18. As shown in FIG. 1, there are two generators 20 coupled to each wind turbine 16, 18. However, any number of generators 20 may be coupled to each wind turbine 16, 18, and the turbines 16, 18 may have the same or a different number of associated generators 20.

System 10 also includes a front generator support wall 34 to which the generators 20 associated with the front turbine 16 are connected and a rear generator support wall 36 to which the generators 20 associated with the rear turbine 18 are connected. A respective compartment may be formed in part by each of the generator support walls 34, 36 to enclose the generators 20.

The generators 20 are preferably fixed to the respective support wall 34, 36 and the support walls 34, 36 are preferably fixed to the central shaft 12 so that the generators 20 and shaft 12 are in a fixed relationship relative to one another. This provides a unitary structure of the central shaft 12, the generators 20 and the support walls 34, 36 with the result that these components move in unison.

Generators 20 are mechanically coupled to the turbines 16, so that the rotation of the turbines 16, 18 is transmitted through the mechanical coupling to the generators 20. The transmission structure which couples the generators 20 to the turbines 16, 18 can have various forms. As shown in detail in FIG. 2, one form of the mechanical structure comprises a gear 38 fixed to each turbine 16, 18 and a gear 40 fixed to or part of a shaft 42 of each generator 20. The shaft 42 of each generator 20 extends through one of the support walls 34, 36.

Each turbine gear 38 has a circular or disc-shaped form and is attached, e.g., by welding, along a lateral side thereof to a side of the respective turbine 16, 18 so that the turbine gear 38 faces the respective support wall 34, 36. Alternatively, the turbine gears 38 may be formed integral with the turbines 16, 18.

Each turbine gear 38 includes teeth along its circumference which are in meshing engagement with the teeth of the respective generator gear 40 of one or more of the generators 20, two in the embodiment shown in FIG. 2. The rotational force of each turbine 16, 18 is therefore converted by the intermeshed gears 38, 40 into rotation of the shafts 42 of two generators 20.

In alternative embodiments of the transmission structure, the intermeshed gears 38, 40 are replaced by a wheel and chain transmission which includes one or more wheels and one or more chains, a wheel and belt transmission which includes one or more wheels and one or more chains or a similar transmission mechanism which is capable of converting rotational movement of the turbines 16, 18 into rotational movement of a shaft of a generator, or movement of another component which causes electricity to be generated by its movement.

Rigid fins 44 are directly or indirectly coupled to the central shaft 12 and/or rear generator support wall 36, depending on the particular lifting structure described below (see FIG. 1). Fins 44 may be spaced equiangularly around the system 10, e.g., four fins 44 placed in two intersecting, perpendicular planes. Any number of fins 44 may be used and the circumferential position thereof determined as desired, or as necessary, in consideration of facilitating angular stability of the system 10 when airborne.

Figure 4:
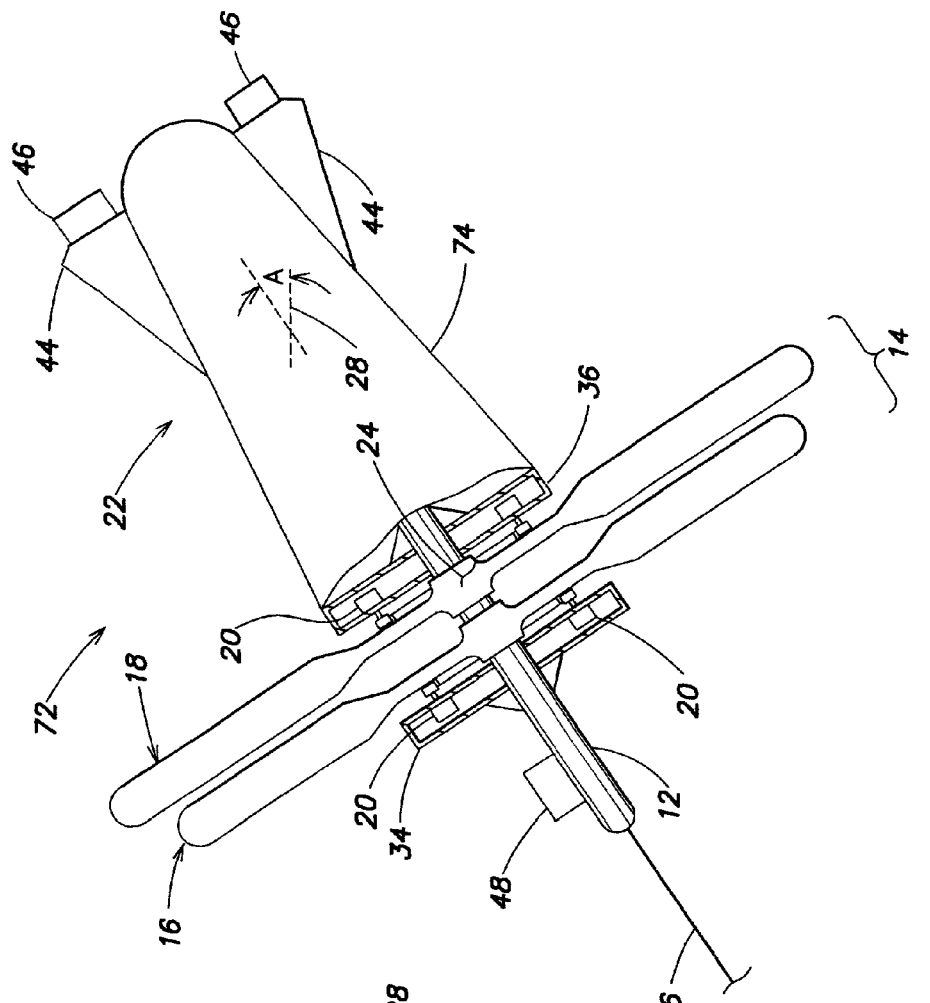
FIG. 4 is a side view, partly in cross-section, of a second embodiment of a wind turbine system in accordance with the present invention.
Figure 4:
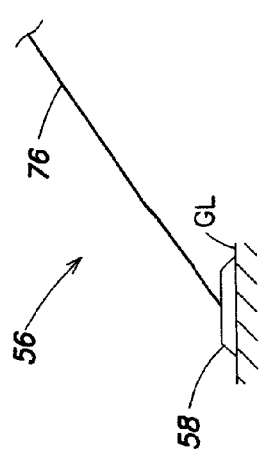
Figure 5:
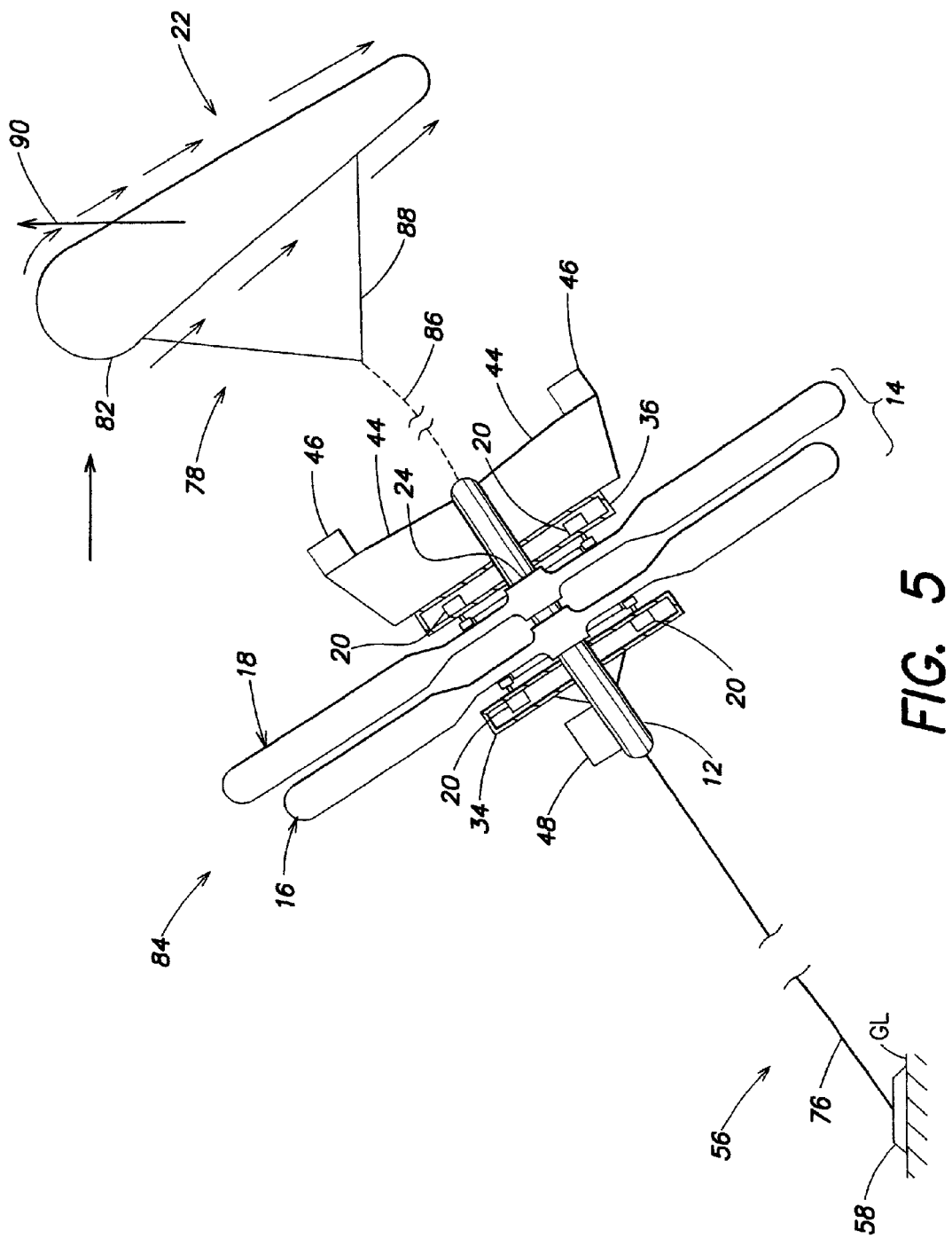
FIG. 5 is a side view of a third embodiment of a wind turbine system in accordance with the present invention.

One or more of the fins 44, and preferably each fin 44, includes a controllable flap 46 at a rear portion thereof. A plurality of flaps 46 may be arranged on each fin 44. Each flap 46 may be attached to the rear edge of a respective fin 44 as shown in FIGS. 1, 4 and 5. The angular position of the flaps 46 is adjustable and controlled by an angular control unit 48 to facilitate angular stability of the system 10 (see FIG. 2). The angular control unit 48 optionally utilizes an electronic artificial horizon as a reference in order to achieve angular stability of the system 10 relative to the horizon. Other stabilization mechanisms, such as one or more gyroscopes and the like, can be additionally or alternatively be used as a reference to enable angular stability of the system 10 to be achieved. Numerous techniques to control adjustable flaps to aid angular stability are known to those skilled in the aeronautical field.

Angular control unit 48 also controls the electricity generated by each generator 20 by directing control signals to each generator 20 via electrical conduits 50, such as cables or wires (see FIG. 2). Depending on the relative position of the angular control unit 48 to the generators 20, the shaft 12 may be provided with apertures 52, and possibly an internal axial conduit, through which the conduits 50 between the angular control unit 48 and the generators 20 pass.

The electricity generated by each generator 20 is variable and depends on the rotation of the shaft 42. The rotation of the shaft 42 is functionally related to rotation of a respective turbine 16, 18. Therefore, by enabling the angular control unit 48 to direct control signals to the generators 20 to control the electricity generation thereof, rotation of the shafts 42 of the generators 20 is controlled and thus, rotation of the turbines 16, 18 is controlled.

Although control signals may be formed by the angular control unit 48 to provide for various control schemes of the generators 20, in a preferred control scheme, the angular control unit 48 controls the generators 20 with a view toward achieving a zero torque on the central shaft 12 and thus create and maintain angular stability of the system 10, or an angular steady-state wherein the rotation of the turbines 16, 18 does not cause rotation of the system 10. Rotation of the turbines 16, 18 and their interaction with the generators 20 inherently causes a rotational torque to be induced on the central shaft 12. Accordingly, if only a single turbine and its associated generators were present, the rotational torque induced by the rotation of the single turbine and associated generators would cause the entire system 10 to continually rotate in the direction in which the turbine is rotating and likely prevent continuous operation of the system 10. However, by providing at least one pair of turbines 16, 18 which rotate in opposite directions, the rotational torque induced by the rotation of one turbine 16 interacting with its associated generators 20 on the central shaft 12 is opposite in direction to the rotational torque induced by the rotation of the other turbine 18 interacting with its associated generators 20 on the central shaft 12.

A primary objective of the invention is therefore to control the rotational torque on the central shaft 12 induced by the rotation of each turbine 16, 18 interacting with its associated generators 20 with a view toward creating a situation where the magnitude of this induced rotational torque is substantially the same, but opposite in direction so that the net rotational torque induced on the shaft 12 will be zero.

The ability to control of the rotational torque induced on the central shaft 12 by the rotation of the turbines 16, 18 interacting with their associated generators 20 is based on the fact that the electricity generated by each generator 20 is dependent on the rotation of the respective shaft 42 which is dependent on the rotation of the turbines 16, 18, via the turbine gears 38 and the generator gears 40 which are coupled to the generator shafts 42. As such, the generators 20 can be controlled, e.g., the load thereof, to cause a specific torque to be induced on the central shaft 12 by the generators 20 based on the rotation of the turbines 16, 18 interacting therewith. In other words, by controlling the electricity-generation by the generators 20, the rotational torque induced on the central shaft 12 by the generators 20 through the turbines 16, 18 can be controlled.

Accordingly, in a preferred embodiment, the generators 20 are controlled by the angular control unit 48 such that the effect of the rotation of turbine 16 on the central shaft 12 (as transmitted through the generators 20 associated with turbine 16) is equal and opposite to the effect of the rotation of turbine 18 on the central shaft 12 (as transmitted through the generators 20 associated with the turbine 18) so that the central shaft 12 is not rotationally affected by the rotation of the turbines 16, 18, i.e., the rotation of the turbines 16, 18 and their interaction with the generators 20 does not cause rotation of the central shaft 12. Since the central shaft 12 does not rotate, the system 10 is rotationally and angularly stable and can operation virtually continuously.

Angular control unit 48 also controls the angular positions of the flaps 46 at the rear part of the fins 44 to aid in maintaining the system 10 in an angular steady-state position.

Angular control unit 48 also controls and integrates inputs from the generators 20 through conduits 50 to a common electricity output conduit 54 which may comprise a plurality of wires. This function may alternatively be performed by another component on the system 10.

Figure 7:
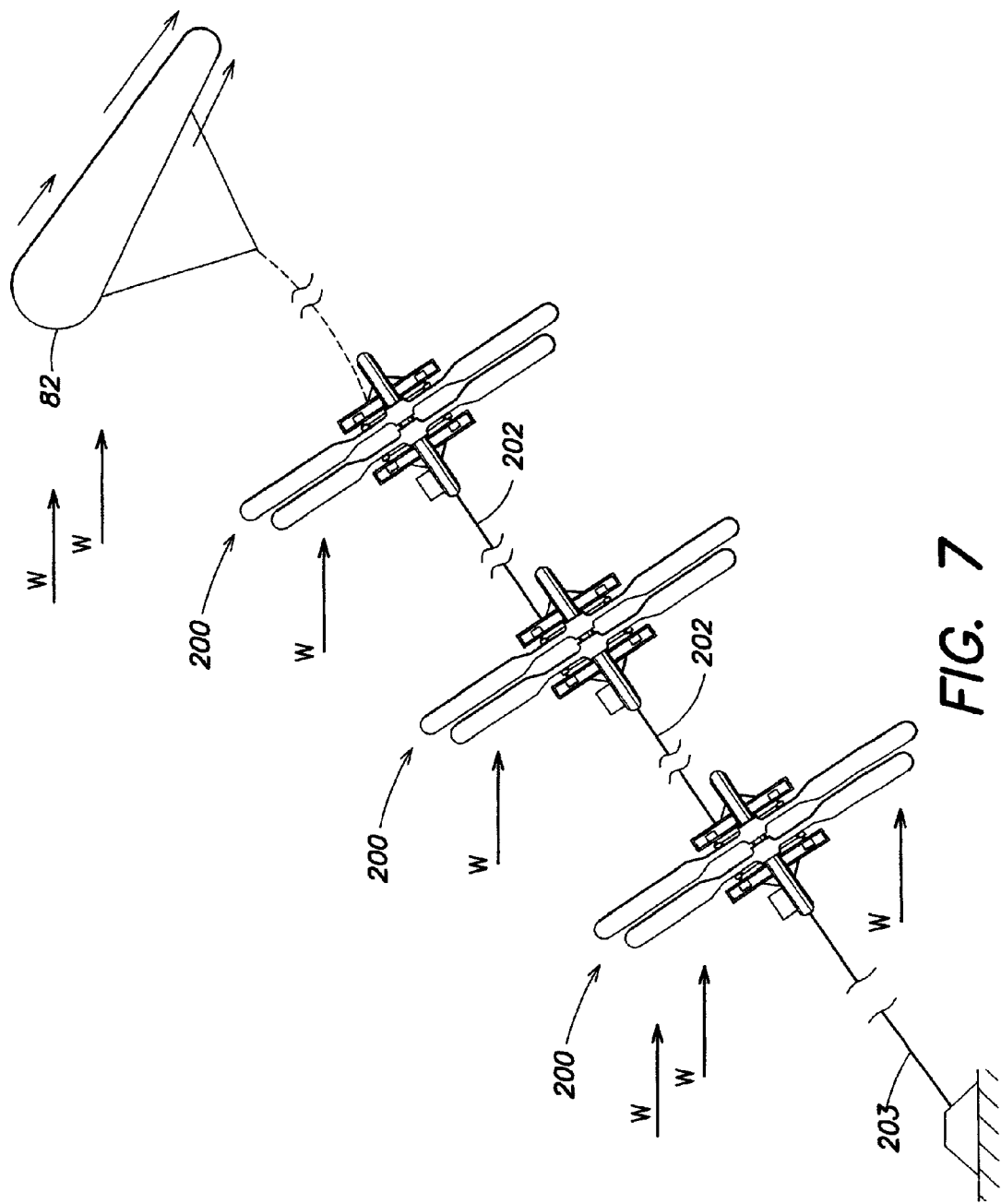
FIG. 7 is a system showing a plurality of turbine sections coupled together and being maintained in an airborne state by a single airborne member.

The system 10 also includes an anchoring system 56 for anchoring the turbine section 14 to an anchor or platform 58 which may be arranged at ground level GL on land or in a body of water (see FIGS. 4, 5 and 7). The anchoring system 56 includes one or more wires or cables to deliver electricity generated by the generators 20 to an electricity grid use, or to energy storage or processing component, such as a battery, a user's machinery, and the like.

The foregoing structure is common to the illustrated embodiments. The illustrated embodiments differ primarily in the structure of the lifting structure 22 and the anchoring system 56.

The lifting structure 22 shown in FIG. 1 comprises a front, inflatable body 60 arranged in front of the turbine section 14 and a rear, inflatable body 62 arranged rearward of the turbine section 14. The number of inflatable bodies may vary depending on the form of the system 10. The front and rear bodies 60, 62 include one or more internal cavities which are filled during use with lighter-than-air gas, such as helium gas, and are provided with a sufficient size and capacity to provide the lifting force necessary to enable the system 10 to be airborne system, i.e., enable the system 10 to rise up from the ground and remain airborne. More specifically, the front body 60 is designed to provide the primary lifting force for the system, while the rear body 62 provides stability, as well as an inherent additional lifting force. The front and rear bodies 60, 62 may be made from flexible urethane, or other materials that seal gases therein, i.e., prevent gas in the interior of the bodies 60, 62 from leaking out. Further, the bodies 60, 62 are constructed in a manner to provide the system 10, when considered in combination with the distribution of the weight of the other components thereof described below, with a center of forces along the line 64. This center of forces line 64 is therefore forward of the turbine section 14 at a location in the front body 60. The construction of the system 10 to enable placement of the center of forces line 64 in this area can be readily determined by those skilled in the art to which the invention pertains in light of the disclosure herein.

The front generator support wall 34 is attached to the front body 60 and the rear generator support wall 36 is attached to the rear body 62. Alternatively, the generator support walls 34, 36 may be formed integral with the front and rear bodies 60, 62, respectively. In either case, the walls 34 and 36 are rigidly connected to the shaft 12, the fins 44 are mounted to the rear body 62.

The anchoring system 56 includes a first tether or cable 66 which connects the angular control unit 48 to the electricity processing component, power grid connection or user's machinery in order to conduct the electricity from the common output 54 thereto, and a second tether 68 which connects the system 10 to the platform 58. A winch is provided to wind or unwind tether 68 and thereby adjust the altitude of the system 10. This winch in FIG. 1, arranged at the end of the tether 68 on the platform 58. Alternatively, the winch 70 could be arranged at the other end of the tether 68, on or mounted to the front body 60.

Tethers 66, 68 are connected to the front body 60 and may overlap along a portion of the path from the system 10 to a common anchor or support point on the platform 58. The tether 66 is then lead to the electricity storage usage or processing component (not shown).

There are various ways to utilize the system 10 to generate electricity. In one embodiment, the front and rear bodies 60, 62 are filled with helium gas to enable the system 10 to rise into the air. The winch 70 is controlled to allow the system 10 to rise, by inducing slack into the tether 68, and once the system 10 reaches a desired operating altitude in the atmosphere, the winch 70 is stopped. The system 10 is thus situated at the desired altitude while tethered to the platform 58 on the ground or at sea via tether 68.

The operational altitude may be determined based on analysis of weather conditions, including wind currents at different possible operating altitudes, and other parameters including the possible presence of aircraft. For example, a particularly beneficial operating altitude has been found to be about 500 meters since it is below commercial aviation flight altitudes and yet high enough to expose the system 10 to relatively high air velocities. The system 10 could be designed to attain altitudes of as much as a few thousand meters.

Once the system 10 is at its desired operational altitude, the wind will cause the system 10 to drift downwind and the system 10 will position itself such that a longitudinal axis of the system 10 is substantially parallel to the wind direction. This self-positioning occurs because the front portion of the system 10, i.e., the front body 60, is anchored to the platform 58 by the tether 68 and because of the placement of the fins 44 at the rear of the rear body 62. Once the system 10 is self-positioned with its longitudinal axis substantially parallel to the wind direction, the axis of each of the turbines 16, 18, which is co-incident with the longitudinal axis of the system 12, will also be substantially parallel to the wind direction and thus, the rotational plane of each turbine 16, 18 will be substantially perpendicular to the wind direction.

The wind causes the turbines 16, 18 to rotate in opposite directions in view of the opposite angle of attack of the blades 26 of the turbines 16, 18, so that the turbine gears 38 rotate and cause rotation of the generator gears 40 via the meshing engagement. Rotation of the generator gears 40 causes rotation of shafts 42 which in turn interact with structure in the generators 20 to generate electricity, this structure being known to those skilled in the art. Electricity generated by each generator 20 passes through a respective conduit 50 to the angular control unit 48 which merges the voltage and passes it through output conduit 54 to be conducted via tether 66 to the ground level electricity storage, usage or processing component.

To maintain the angular stability of the system 10, angular control unit 48 controls the electricity each generator 20 generates and thus controls the rotational torque that the rotation of each turbine 16, 18 causes the generators 20 to induce on the central shaft 12. Appropriate control of the generators 20 enables the sum of the rotational torques induced by the generators 20 on the central shaft 12 to be zero. Without any rotational torque affecting the central shaft 12, the system 10 is able to operate without turning and can efficiently generate electricity.

To provide an approximate indication of the benefits of the system 10, it is expected that during operation, when the wind power density is about 3000 watts per square meter, the effective area of the turbines 16, 18 is about 5,000 square meters and the efficiency of the system is about 33%, the output power of the system 10 will be about 5 mega watts.

FIG. 4 shows another system in accordance with the invention, designated generally as 72, wherein the lifting structure 22 consists of a single inflatable body 74 arranged rearward of the turbine section 14 and the anchoring system 56 includes a tether 76 connected to a front area of the central shaft 12. The inflatable body 74 is provided with an interior receivable of a lighter-than-air gas and constructed in a similar manner as inflatable bodies 60, 62 in the embodiment shown in FIG. 1. The rear generator support wall 36 is attached to the inflatable body 74 or alternatively, formed integral with the inflatable body 74, and the fins 44 are mounted to the inflatable body 74.

When the body 74 is filled with a lighter-than-air gas, the system 72 will be oriented such that the body 74 is above the turbine section 14. Tether 76 includes both an electrical conduit for conveying electricity generated by the generators 20 to electricity storage, usage or processing component and an anchoring cord.

System 72 operates differently than system 10 in that in the absence of wind, the system 72 will assume a substantially vertical orientation, i.e., the tether 76 will extend vertically upward from the platform 58. When wind is blowing in direction 28, the system 72 will be urged downwind thereby creating an angle A between the wind direction 28 and the rotational axis of the turbines 16, 18. The magnitude of angle A depends on the velocity of the wind, and in the illustrated embodiment, it is about 45°. The effective area of operation of the turbines 16, 18 is a function of the angle A, i.e., the area of the turbines rotational plane multiplied by cosine (angle A) which when the angle A is about 45° is about 70% of the area of the rotation plane of the turbines 16, 18.

Otherwise, the manner in which system 72 operates including the manner in which the angular stability thereof is maintained is substantially the same as for system 10. A winch, not shown, may also be provided and connected to tether 76 to control the altitude of the system 74.

FIG. 5 shows another system in accordance with the invention, designated generally as 80, wherein the lifting structure 22 comprises an independent lift-generating body 82 which is separated and spaced apart from an assembly 84 of the turbine section 14, generators 20, fins 44 and associated structure. In this embodiment, the fins 44 are directly connected to the central shaft 12 and possibly also to the compartment housing the generators 20 associated with the rear turbine 18.

A plurality of lift-generating bodies 82 may be provided and each connected to the assembly 84 by a suitable connection structure 78.

The connecting structure 78 which enables the lift-generating body 82 to be separated from the turbine-generator assembly 84 includes an assembly of tethers 86, 88 which connect an underside of the lift-generating body 82 to a rear part of the central shaft 12.

The lift-generating body 82 may be inflatable, i.e., provided with an interior receivable of a lighter-than-air gas and constructed in a similar manner as inflatable bodies 60, 62 in the embodiment shown in FIG. 1.

Further, the lift-generating body 82 may be provided with an aerodynamic shape which is designed to enable the lift-generating body 82 to automatically assume a position in which it has an angle of attack relative to the wind direction 28 to induce a large lifting force on the system 80, in the direction of arrow 90. Selection of such an aerodynamic shape and the manner in which a lighter-than-air body can be constructed with this shape are well-known to those skilled in the art. In this case, the tethers 86, 88 connected to the underside of the lift-generating body 82 would transfer the lifting force of the lift-generating body 82 in the direction of arrow 90 into lift of the assembly 84.

Alternatively, the lift-generating body 82 may be in the form of a kite or an airfoil, without any cavity which receives lighter-than-air gas. In these embodiments, the lifting force is created solely by the aerodynamic characteristics of the lift-generating body 82.

Alternatively, the lift-generating body 82 may be in the form of an unmanned helicopter driven by electricity drawn from a source on the ground level during takeoff and landing phases and/or from the generators 20 during operation of the system 80. The construction details of such an unmanned helicopter, and similar aircraft, are known to those skilled in the field.

An advantage of separating the lift-generating body 82 from the turbine-generator assembly 84 is that the lift-generating body 82 is not disturbed by the operation of the turbines 16, 18 or by the wind flow over the turbines 16, 18, provided the tethers 86, 88 are sufficiently long to allow the lift-generating body 82 to be outside of the wake of the turbines 16, 18.

A winch, not shown, may also be provided and connected to tether 76 to control the altitude of the system 80.

Figure 6:
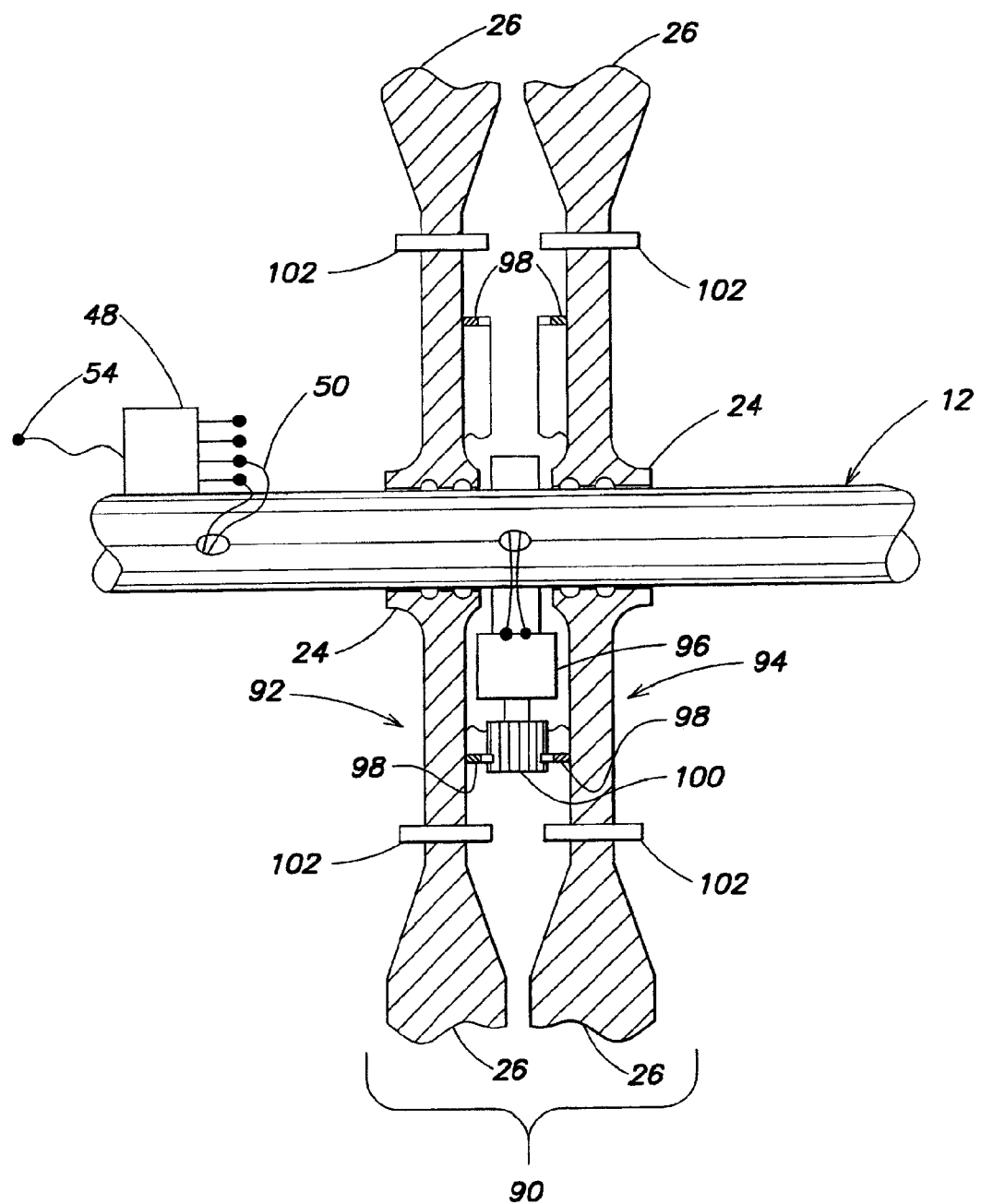
FIG. 6 is a detailed view of the turbine section of another embodiment of a wind turbine system in accordance with the present invention.

FIG. 6 shows another embodiment of a turbine section 90 that may be used in the invention, i.e., in any of the embodiments disclosed above instead of turbine section 14. Turbine section 90 includes two turbines 92, 94 which are both coupled to a single, common generator 96 via a transmission structure. Turbines 92, 94 rotate in opposite directions in the same manner turbines 16, 18 described above, and their properties are generally similar to the properties of turbines 16, 18 described above. The generator 96 is fixed to the central shaft 12.

The transmission structure includes a large diameter gear attached to or formed integral with a lateral side of each turbine 92, 94 facing the other turbine 92, 94, and a generator transmission gear 100 having teeth which mesh with teeth on the sides of both of the turbine gears 98. Since both turbine gears interact with and drive the generator transmission gear 100 and the turbines 92, 94 rotate in opposite direction, the turbine gear 98 of the turbine 92 causes the generator transmission gear 100 to rotate in one direction while the turbine 98 of the turbine 94 causes the generator transmission gear 100 to rotate in the opposite direction. As a result, torque is not induced on the central shaft 12 by the generator 98 through the rotation of the turbines 92, 94. That is, any torque that would be induced on the central shaft 12 by the rotation of turbine 92 interacting with the generator 98 is canceled by any torque that would be induced on the central shaft 12 by the rotation of turbine 94 interacting with the generator 98. This can be ensured by appropriate selection of the aerodynamic characteristics of the blades 26 of the turbines 92, 94, e.g., their angle of attack described below, and other constructional parameters of the turbines 92, 94.

FIG. 6 also shows mechanisms 102 for varying the angle of attack of the blades 26 of the turbines 92, 94. The structure and operation of any mechanisms which vary the angle of attack of blades of a turbine in known wind turbine systems may be used as mechanisms 102. Mechanisms 102 are coupled to and controlled by the angular stability control unit 48 in order to aid in maintaining the angular stability of the system, and thus the system can be angularly stable even though it includes only a single electricity generator 96.

Any of the systems described above can be constructed to operate over land or offshore, over a body of water. Moreover, the systems are easily transportable from one location to another, e.g., to maximize the exposure of the systems to fast winds wherever they may be present. An offshore operation in which the system is mounted to a platform on a body of water is likely to be cheaper and easier to implement than existing offshore wind-based electricity generating systems which are mounted on towers because the system in accordance with the invention requires only an anchoring point on the ocean floor, or on a floating platform, with no other constructions.

Methods for generating electricity using any of the wind-based systems described above would entail causing the systems to rise to an operating altitude and then managing the operation thereof, including managing the generation of electricity provided through the cable leading the each system. The operating altitude would be adjusted depending on wind conditions.

FIG. 7 shows a plurality of turbine sections, each comprising a pair of turbines 200, a pair of generators and a shaft, which are coupled together by elongated members 202, such as cables or the like. A cable or the like 203 is provided to tether the system to the ground. The tandem-mounted turbine sections 202 (which may be the same as those previously discussed) are connected an airborne lifting system 82, similar to the system 82 shown in FIG. 5. A description of the lifting body 82 is therefore omitted. The turbine sections may have the electricity produced thereby coupled to the ground by an electrical conductor system which is connected to the members 202, or which is a part of the members 202, or which may run along members 202. The direction of the wind is shown by the horizontal arrows W in FIG. 7.

Figure 8:
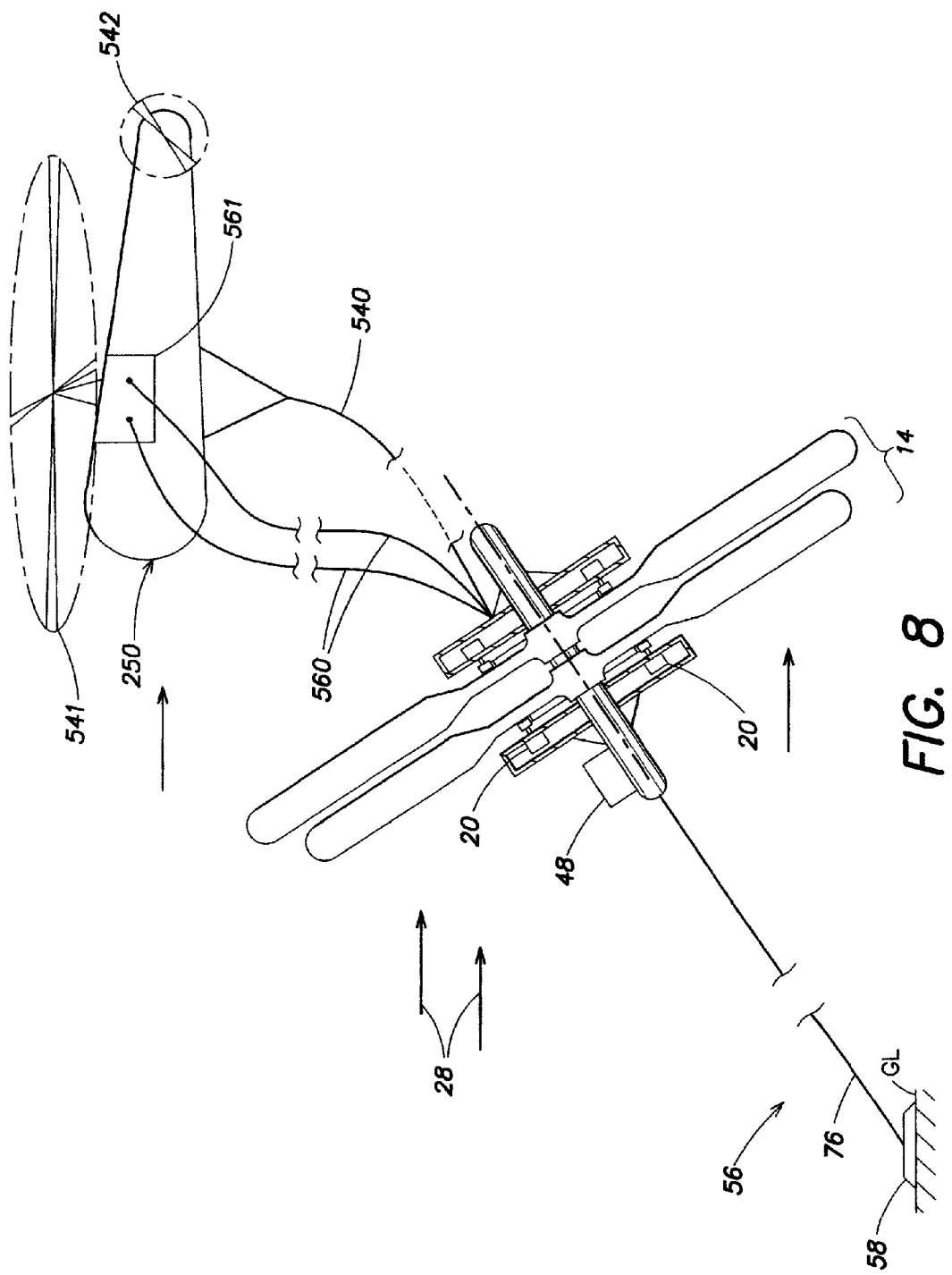
FIG. 8 shows a system with a turbine section maintained airborne by a helicopter.

FIG. 8 shows a system similar to FIG. 5 but wherein the turbine section (or sections as shown in FIG. 7) is maintained airborne by a helicopter 250 either manned or unmanned. The turbine section is tethered to the helicopter by the tether connection 540. The helicopter includes main blades 541 and rear blades 542, as is conventional, and may be powered by electricity produced from the turbine section via, for example, schematically shown electrical conductors 560 which are coupled to the turbine section to drive a motor 561 of the helicopter. Alternatively, the helicopter can be powered by energy from the ground or may be self-powered from either a self-contained electrical storage system, or any other fuel-driven motor.

Figure 9:
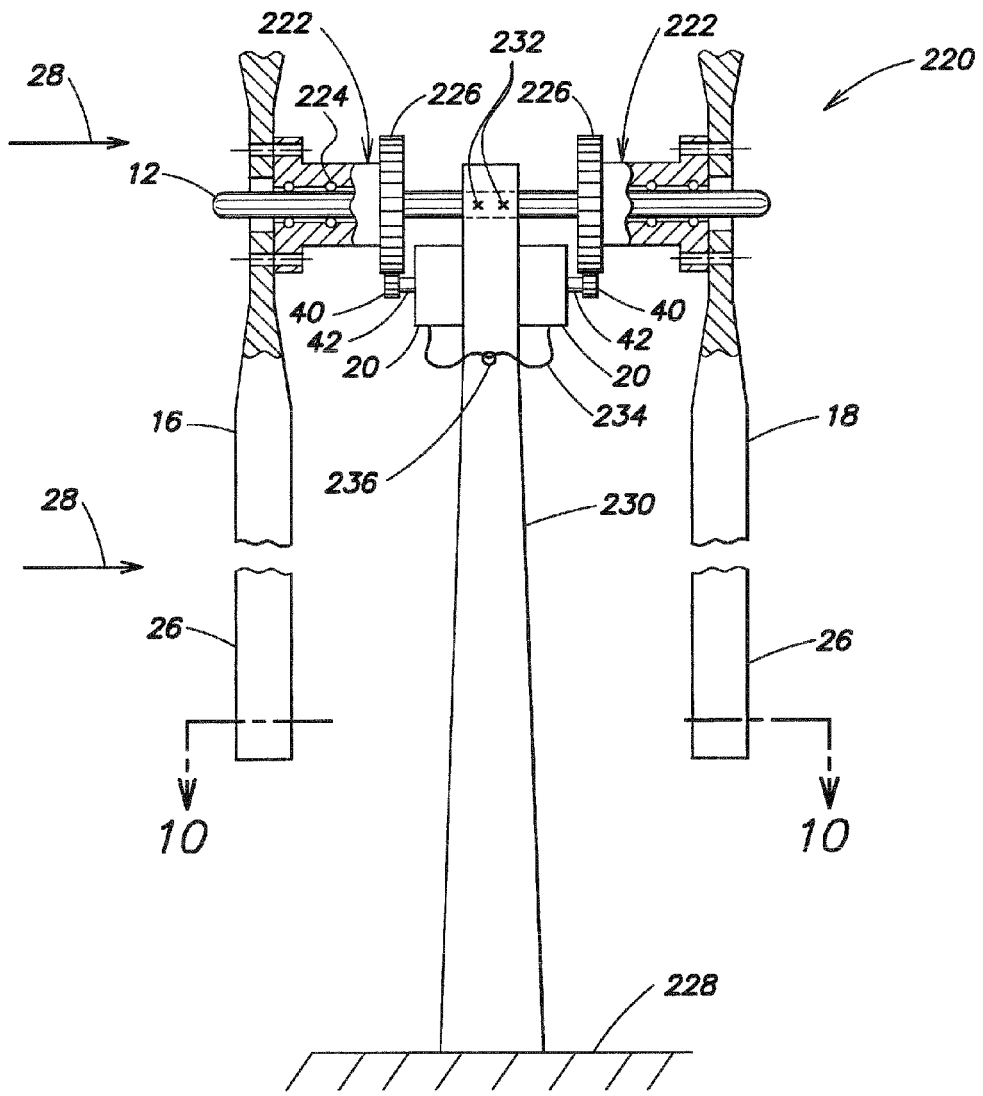
FIG. 9 shows a system with a turbine section mounted on a tower.
Figure 10:
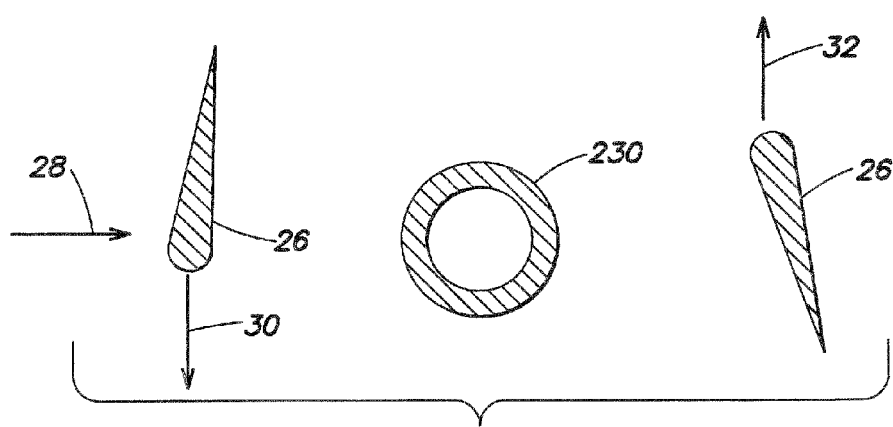
FIG. 10 is a cross-sectional view taken along the line 10-10 of FIG. 9.
Figure 11:
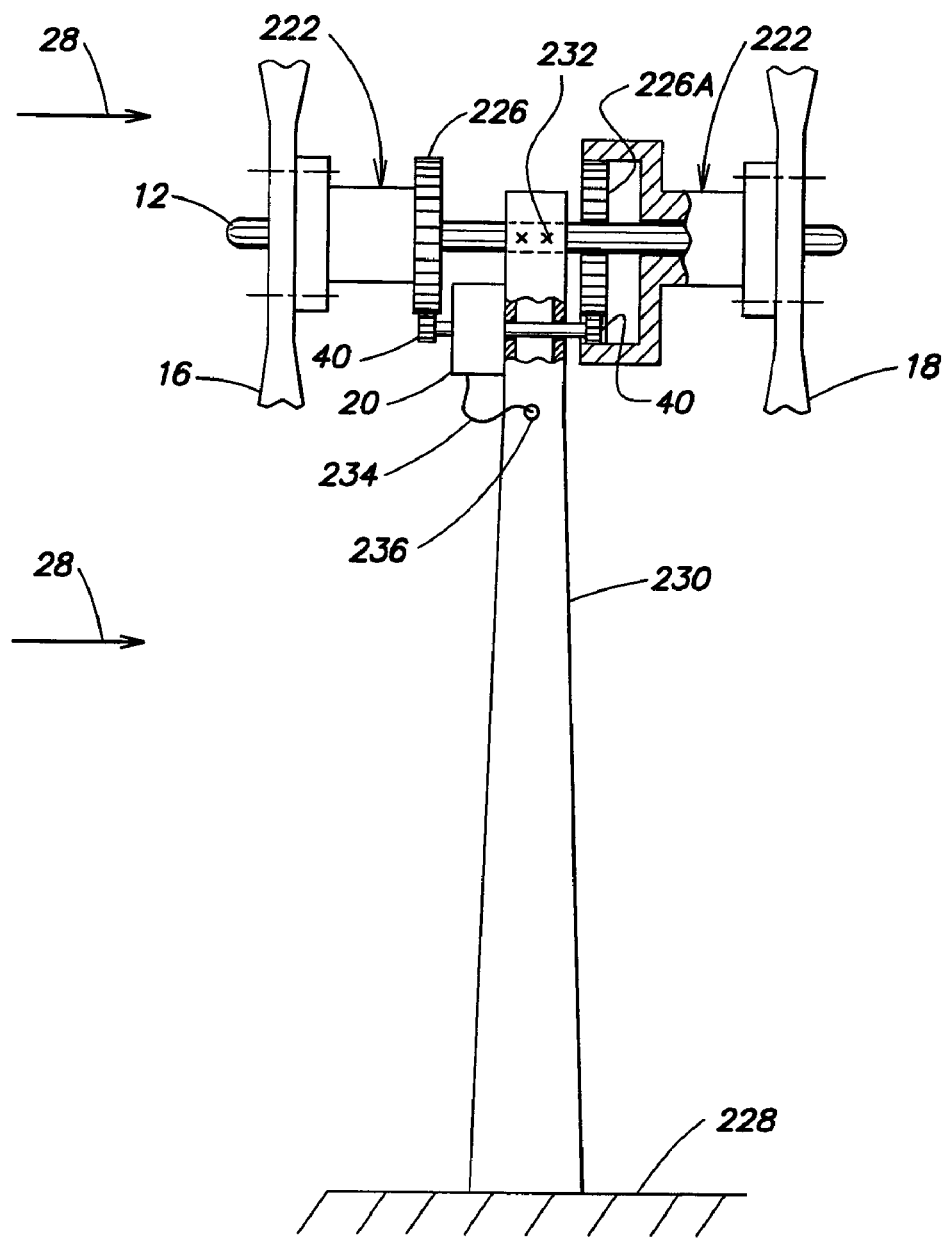
FIG. 11 shows another system with a turbine section mounted on a tower.

Referring now to FIGS. 9-11, a stationary, non-airborne wind turbine system in accordance with a first embodiment of the invention is designated generally as 220 and the same components described above that are present in this embodiment are assigned the same reference numerals. The embodiment shown in FIG. 9 includes bearing assemblies 222 fixed to an inward side of the turbines 16, 18, i.e., on the side of each turbine that faces the other turbine, and bearings 224 as part of the bearing assembly 222 that contact the outer surface of the central shaft 12. The bearing assemblies 222 may be fixed to the turbines 16, via any means known to those skilled in the art, e.g., welding, screws and the like. Different bearing assemblies may be used in this embodiment of the invention.

The wind turbine system 220 is fixed to the ground 228 via a tower structure 230 that has a height that is determined based on the operational height at which the turbines 16, 18 are to be mounted. The tower structure 230 can have various constructions, and cross-sectional shapes. The tower structure 230 also includes appropriate mounting structure 232 to fixedly secure the central shaft 12 thereto.

Generators 20 are fixed to the tower structure 230 and mechanically coupled to the turbines 16, 18, so that as a result, the generators 20 are mounted so as to be fixed relative to the shaft 12. Rotation of the turbines 16, 18 about the common shaft 12 is transmitted through a mechanical coupling to the generators 20. The mechanical transmission structure that couples the generators 20 to the turbines 16, 18 can have various forms. One form of the mechanical structure comprises a gear 226 fixed to each bearing assembly 222 that is in turn fixed to a respective turbine 16, 18, and a gear 40 fixed to or part of a shaft 42 of each generator 20. Alternatively, the gears 226 may be fixed to the turbines 16, 18 and the bearing assemblies 222 interposed between the shaft 12 and the turbines 16, 18 (similar to the construction shown in FIG. 1).

Wires 234 couple the generators 20 to electricity usage and/or storage components and extend into an interior of the tower structure 230 through an aperture 236 therein and through the interior of the tower structure 230 to the ground. To this end, the tower structure 230 may be partly hollow, e.g., include a channel extending along its vertical length.

FIG. 10 shows exemplary cross-sectional profiles of the blades 26 of the turbines 16, 18 which are provided to enable turbines 16, 18 to rotate in opposite directions. The angle of attack of the blades 26 of the front turbine 16 relative to the wind direction 28 is opposite the angle of attack of the blades 26 of the rear turbine 18. The forces 30, 32 therefore act on the turbines 16, 18 in opposite directions causing the turbines 16, 18 to rotate in opposite rotational directions, i.e., one clockwise and the other counterclockwise.

The span and other aerodynamic characteristics of the front and rear turbines 16, 18 and blades 26 thereof may be different in accordance with the requirement that each turbine 16, 18 produces almost the same amount of power (to enable zero torque on the shaft 12 to be present for the purpose described above).

A control unit or controller, not shown, may be provided to control the electricity generated by each generator 20 by directing control signals to each generator 20 via electrical conduits, such as cables or wires. By directing control signals to the generators 20 to control the electricity generation thereof, rotation of the shafts 42 of the generators 20 is controlled and thus, rotation of the turbines 16, 18 is controlled.

In a preferred control scheme, the generators 20 are controlled with a view toward achieving a zero torque on the central shaft 12, i.e., such that the rotational torque induced by the rotation of one turbine 16 interacting with its associated generator 20 on the central shaft 12 is opposite in direction to the rotational torque induced by the rotation of the other turbine 18 interacting with its associated generator 20 on the central shaft 12. This creates a situation where the magnitude of this induced rotational torque is substantially the same, but opposite in direction so that the net rotational torque induced on the shaft 12 will be zero. As such, there will be almost zero torque induced on the tower structure 230 that supports the shaft 12. Indeed, it is an advantage of this embodiment of the invention that torque induced on the tower structure 230 by rotation of the turbines 16, 18 is minimized. Additional details about this torque-zeroing or torque-balancing aspect of the invention and advantages thereof are described above.

FIG. 11 shows a stationary wind turbine system in accordance with a second embodiment of the invention that is designated generally as 240 and differs from the embodiment shown in FIG. 9 in that there is only a single generator 20 mounted to the tower structure 230, and both turbines 16, 18 are coupled to this generator 20 via a mechanical coupling. This mechanical coupling comprises two gears 40 that are fixed to or part of a common shaft 42 of the generator 20. Each gear 40 may be fixed at a respective end region of the shaft 42. The shaft 42 extends through the tower structure 230 and either clearance is provided to avoid contact between the shaft 42 and the tower structure 230 or one or more bearings are interposed between the shaft 42 and the tower structure 230. Rotation of turbine 16 in one direction and rotation of the turbine 18 in the opposite direction cause the same direction of rotation of the shaft 42 (via gears 40 and meshing gears 226, 226A).

Another advantage of having multiple turbines that rotate in opposite directions is that a higher rate of efficiency of each turbine that is immediately downwind of another turbine rotating in the opposite direction is obtained. For example, for one pair of turbines, the front turbine will rotate in one direction and as a result of its rotation, will impart an angular component to the wind passing thereby in the opposite direction of its rotation. The wind with the angular component then passes the rear turbine and improves its efficiency in view of the imparted angular component. This effect continues for other turbines arranged downwind of the pair of turbines, so long as each turbine rotates in an opposite direction from the immediately upwind turbine and a sufficient spacing is provided between the turbines, which spacing can be derived from routine experimentation as it varies based on, for example, the dimensions of the turbines.

It is to be understood that the present invention is not limited to the embodiments described above, but include any and all embodiments within the scope of the following claims. While the invention has been described above with respect to specific apparatus and specific implementations, it should be clear that various modifications and alterations can be made, and various features of one embodiment can be included in other embodiments, within the scope of the present invention.

The invention claimed is:

1. A system for producing electricity from wind energy, comprising:
    a turbine section comprising:
        a shaft;
        at least first and second turbines rotatably mounted to said shaft and arranged to rotate independently of one another and in opposite directions about said shaft when subjected to a same wind; and
        at least one generator coupled to said at least first and second turbines and arranged to convert rotation of said first and second turbines into electricity, said at least one generator being mounted so as to be fixed relative to said shaft, the magnitude of electricity generation by said at least one generator being related to a torque induced on said shaft by said at least one generator responsive to rotation of said turbines relative to said shaft,
    said turbines having aerodynamic characteristics which provide in combination with the effect of the electricity generation by said at least one generator a situation where a sum of torques acting on said shaft is substantially zero;
    wherein electricity generated by said at least one generator is conducted to an energy utilization device for usage or to electricity storage.

2. The system of claim 1, wherein said at least one generator comprises first and second generators respectively coupled to said first and second turbines.

3. The system of claim 1, wherein said at least one generator includes a rotatable shaft whose rotation causes generation of electricity, and further comprising a transmission system interposed between said turbines and said at least one generator for transmitting rotation of said turbines into rotation of said shaft of said at least one generator and thus generation of electricity by said at least one generator.

4. The system of claim 1, further comprising:
    a lifting system coupled to said turbine section for generating a lifting force to cause said turbine section to be airborne at a desired altitude; and
    an anchoring section arranged to anchor said turbine section relative to the ground,
    whereby said system is an airborne system.

5. The system of claim 4, further comprising an angular stability controller coupled to said at least one generator for controlling the electricity generation by said at least one generator and thus the magnitude of the torque that each of said at least one generator induces on said shaft, said angular stability controller being adapted to control said at least one generator in order to achieve substantially zero resultant torque induced on said shaft by said first and second turbines through said generators and thereby enable continuous angular stability of the system.

6. The system of claim 5, further comprising at least one fin fixed relative to said shaft, and a controllable flap attached to each of said at least one fin, said controllable flap having a variable angular position relative to said fin to which it is attached, and said angular stability controller being arranged to control said variable angular position of said flap of each of said at least one fin to aid in maintaining angular stability of the system.

7. The system of claim 5, wherein said first and second turbines comprise blades which have a controllable variable angle of attack, said angular stability controller being arranged to control the angle of attack of said blades of said first and second turbines to aid in maintaining the angular stability of the system.

8. The system of claim 4, wherein said anchoring section comprises a tether connected to said lifting structure or to said shaft, and a winch for adjusting a length of said tether relative to the ground.

9. The system of claim 4, wherein said lifting system comprises a first inflatable body arranged on one side of said turbine section and a second inflatable body arranged on an opposite side of said turbine section, said first and second inflatable bodies being receivable of a lighter-than-air gas.

10. The system of claim 4, wherein said lifting system comprises a single inflatable body coupled to said turbine section and receivable of a lighter-than-air gas, and said anchoring section comprises a tether connected to said turbine section.

11. The system of claim 4, wherein said lifting system comprises at least one independent lift-generating body spaced apart from said turbine section, and said at least one lift-generating body being connected to said turbine section to transfer a lifting force generated by said at least one lift-generating body to said turbine section.

12. The system of claim 11, further comprising:
a connecting device connecting said at least one lift-generating body to said shaft;
an angular stability controller coupled to said at least one generator for controlling the electricity generation by said at least one generator and thus the magnitude of the torque that each of said at least one generator induces on said shaft, said angular stability controller being adapted to control said at least one generator in order to achieve substantially zero resultant torque induced on said shaft by said first and second turbines through said at least one generator and thereby enable continuous angular stability of the system; and
at least one fin coupled to said shaft and a controllable flap attached to each of said at least one fin, said controllable flap having a variable angular position relative to said fin to which it is attached, and said angular stability controller being arranged to control said flap of each of said at least one fin to aid in maintaining angular stability of the system.

13. The system of claim 11, wherein said at least one lift-generating body is non-inflatable and has aerodynamic characteristics which enable it to assume a position in which it generates and transfers sufficient lifting force to said turbine section when exposed to wind to enable said turbine section to remain airborne.

14. The system of claim 11, wherein said at least one lift-generating body comprises an unmanned helicopter driven by power drawn from a power source or from electricity generated by said turbine section.

15. The system of claim 1, wherein said first and second turbines each comprise rotatable blades, and wherein the blades of a turbine upwind of another turbine have a smaller diameter than the blades of the turbine which is downwind of the upwind turbine.

16. The system of claim 1, wherein said at least one generator consists of a single generator, further comprising a transmission structure for coupling both of said first and second turbines to said single generator.

17. The system of claim 16, wherein said transmission structure comprises a first gear fixed to each of said turbines and rotating with said turbines, and a pair of second gears each in meshing engagement with a respective one of said first gears and connected to a common shaft of said generator.

18. The system of claim 1, further comprising a structure that fixes said turbine section to the ground such that the system is a stationary, non-airborne wind turbine system.

19. The system of claim 18, wherein said structure is a tower, said shaft being attached to said tower to prevent movement of said shaft, said at least one generator being mounted on said tower.

20. The system of claim 18, wherein said tower is connected to said shaft between said first and second turbines, further comprising:
a bearing assembly for rotatably supporting each of said first and second turbines on said shaft and which is arranged between said first and second turbines; and
a gear attached to each of said bearing assemblies and rotatable with a respective one of said first and second turbines,
said at least one generator being arranged one said tower structure and being mechanically coupled to both of said gears.

21. The system of claim 18, wherein said first turbine is upwind of said second turbine and said first and second turbines are spaced apart from one another such that said first turbine imposes an angular velocity component on the wind passing through its rotation area in an opposite direction of its rotation with the wind having the imposed angular velocity component passing through said second turbine to thereby increase efficiency of said second turbine.

* * * * *